Apr. 24, 1923.

M. DONAUER 1,453,041

CONDENSER

Filed March 10, 1920

INVENTOR
MAX DONAUER

BY *Ridley Slough & Tiles.*

HIS ATTORNEYS

Apr. 24, 1923.  
M. DONAUER  
1,453,041  
CONDENSER  
Filed March 10, 1920  
2 Sheets-Sheet 2

INVENTOR  
MAX DONAUER  
BY  
HIS ATTORNEYS

Patented Apr. 24, 1923.

1,453,041

UNITED STATES PATENT OFFICE.

MAX DONAUER, OF ELYRIA, OHIO, ASSIGNOR TO THE ELYRIA ENAMELED PRODUCTS COMPANY, OF ELYRIA, OHIO, A CORPORATION OF OHIO.

CONDENSER.

Application filed March 10, 1920. Serial No. 364,639.

*To all whom it may concern:*

Be it known that I, MAX DONAUER, a citizen of the United States, and a resident of Elyria, Lorain County, Ohio, have invented certain new and useful Improvements in Condensers; and I do hereby declare the following to be a full, clear, and exact description of the invention, such as will enable others skilled in the art to which it appertains to make and use the same.

This invention relates to condensers for changing gases and vapors to liquid condition through reduction of temperature by cooling mediums, such as water or other liquids.

One object of my invention is to provide condenser elements that can be readily assembled to produce a condenser of any desired size.

Another object of my invention is to provide a condenser element that will produce maximum condensation with minimum use of cooling fluid.

A further object is to provide dished condenser elements with suitable apertures to permit the flow of condensed gases and vapors through the condenser.

Other objects will be referred to in the specification, reference being had to the drawings, in which.

Figure 2:
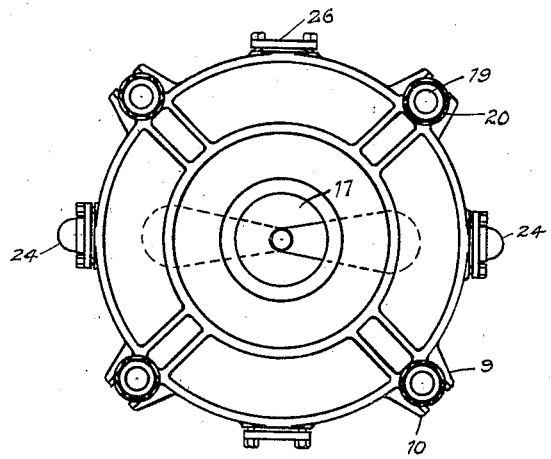
Fig. 2 is a top view of the assembly.
Figure 1:
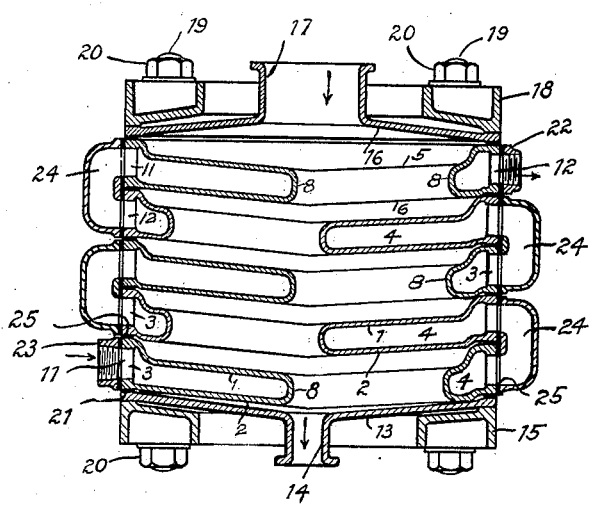
Fig. 1 is a partial sectional elevation of the condenser assembly.

Referring to the drawings, the condenser element consists of two plates 1 and 2 joined at their periphery by walls 3, to form an enclosure or chamber 4 for the cooling fluid. The plates 1 and 2 are preferably dished or concaved on the upper sides, as shown, though this is not essential as far as the other features of the invention are concerned. The dishing of the upper sides of the top plate 1 permits the condensed gases and vapors to flow down through the condenser in a way to be later described. Since the upper side of the plate 1 is preferably dished, as described, it is advisable to have the bottom side thereof of the same shape, and to similarly construct the bottom plate 2. This gives an inner cooling chamber of approximately uniform depth.

The upper plate 1 has a slot 5 and a similar slot 6 is formed in the plate 2, preferably directly below the slot 5. The slots extend from the center portion 7 outwardly toward the periphery, as shown more clearly in Fig. 3. The openings 7 in both plates are arranged at the bottom of the concavity, so that the condensed liquid can readily flow through the passage 7' formed by the walls 8, which joins the plates 1 and 2 adjacent the edges of the slots.

The plates and walls of the improved condenser element are preferably cast integrally, as shown on the drawings, but my invention is not limited to this commercially desirable form.

The elements may have lugs 9 and 10 on the periphery to enable them to be clamped in place by suitable bolts, later referred to. The walls 3 of the element are also provided with openings 11 and 12 for the ingress and egress of cooling fluid. These openings are arranged for receiving standard fittings, so that the cooling fluid can be transmitted from one element to another in the assembly.

Figure 3:
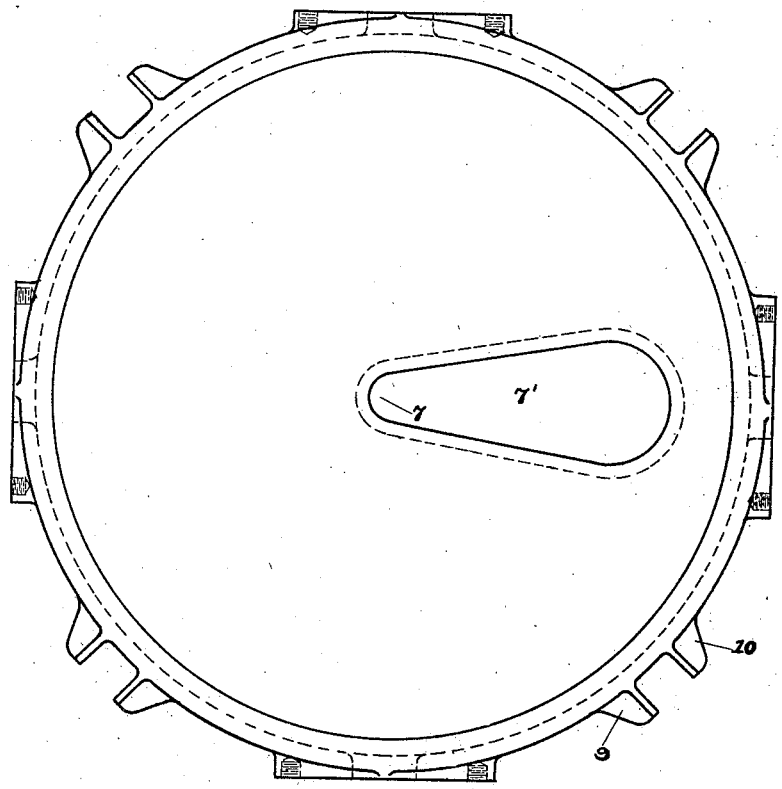
Fig. 3 is a plan view of a condenser element.
Figure 4:
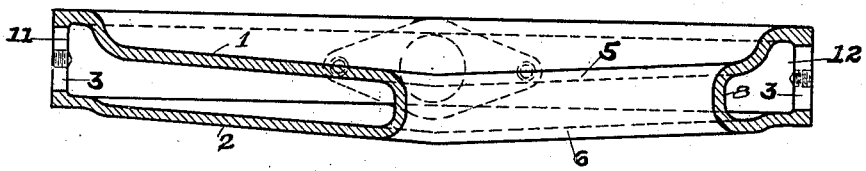
Fig. 4 is a sectional view of a condenser element.

Additional openings, similar to openings 11 and 12, as shown in Figs. 2, 3 and 4 may be provided, as shown, so that fluid from different sources may enter the condenser, or may be discharged therefrom to different discharge pipes; or they may be employed for the purpose of securing to the sides of the condenser a thermometer, the bulb of which may project within the condenser and the indicating portion may be visible, so that an observer can tell the temperature of the cooling fluid at a point at right angles to the points of ingress or egress. If desired, these extra openings may be dispensed with, or when provided, as shown, may have covers 26 (as shown in Fig. 2) for closing these openings.

The condenser elements may be provided with any desired form of cover and bottom members, but I prefer to make the bottom member 13 of dished shape, with a neck or nipple 14, to drain out the condensed liquid. An annular casting 15, with clamping lugs 9 and 10, may be used beneath the bottom member 13. A top member 16 for the condenser is shaped somewhat like the bottom member 13, excepting it preferably has a larger neck 17 for the entrance of the gases or vapors to be condensed.

A condenser of any desired capacity can be built up in the following way: The bottom member 13 is placed on the annular ring 15 and an element is placed on the former with the apex or dished portion downward. Another element is then placed on the first one with the same position, excepting it is revolved 180°, as shown. The assembling is thus continued, with the adjacent elements revolved 180°, as described, until a sufficient height has been reached, when the top member 16 and annular clamping ring 18 are placed in position, the top 16 being inverted in respect to the bottom member 13.

When the lugs 9 and 10 are in superposed position, the slots in adjacent elements are substantially 180° apart, so that the vapors and gases pass in a zigzag course through the condenser. The clamping bolts or rods 19 are placed between the lugs 9 and 10 and the nuts 20 screwed down to clamp the parts in position. To prevent leakage of gases or vapors, gaskets 21 should be used between elements, as shown.

When the elements are assembled, as illustrated, outlet and inlet fittings 22 and 23 are secured to the top and bottom elements, and caps 24 are bolted to adjacent elements over the openings leading to the chamber 4. Suitable gaskets 25 are used to form tight joints.

It will be evident from the foregoing that a standard condenser element may be made and used to form condensers of any desired length. The cost of production will, therefore, be materially lowered.

In use, the gases or vapors are passed into the opening in the neck 17 at the top and the condensed liquid flows out the bottom neck 14. The cooling water passes into the opening in the fitting 23, flows through the casting and around the slot or passage 7', out into the return bend 24 and into the passage 4 of the next element above. In this way the cooling fluid passes in a zigzag course from the bottom to the top, where it flows out the outlet in the pipe fitting 22.

The vapors or gases pass into the condenser at the top through the opening in neck 17, and flow through the top element, thence through the passage 7' to the adjacent element below. Since the passages 7' of adjacent elements are on opposite sides of the condenser, the vapors will flow around the elements in two or more streams before passing through the passage into the next element below. In this way the vapors and gases will flow in a zigzag course from the top of the condenser to the bottom. This is the proper direction of flow because the cooled water, or other cooling fluid, coming in at the bottom, meets the coldest portion of the vapors, and the hottest portion of the cooling fluid issuing at the top meets the hottest portion of the vapors; consequently there is a continual transmission of heat from the vapors and gases to the cooling fluid.

The peculiar saucer-shaped castings or elements have an efficient action, as the liquid condensed from the vapors and gases flows readily down to the central part 7 of the passages where it falls directly through the condenser to the outlet passage in neck 14, without being compelled to flow over the cooling surfaces of the other elements below.

It will be apparent that various modifications may be made in my improvements, without in any way departing from the spirit of the invention.

Having described my invention, what I claim is:

1. A condenser element consisting of a dished top plate having an opening in the bottom of the dished portion, a bottom plate having an opening in alignment with the first-mentioned opening, walls joining said plates at their periphery to form a chamber for cooling fluid, and walls joining said plates adjacent the edges of said openings to form a passage through the element.

2. A condenser element consisting of a dished top plate, a bottom plate, walls joining said plates at their periphery to from a chamber for cooling fluid, said plates having superposed slots and walls joining said plates adjacent the edges of said slots to form a passage through the element.

3. A condenser element consisting of dished top and bottom plates, walls joining said plates at their periphery to form a chamber for cooling fluid, said plates having superposed slots and walls joining said plates adjacent the edges of said slots to form a passage through the element.

4. A condenser element consisting of top and bottom plates, walls joining said plates at their periphery to form a chamber for cooling fluid, spaced lugs on said walls, said plates having superposed slots, and walls joining said plates adjacent the edges of said slots to form a passage through the unit the first-mentioned walls having openings to permit the ingress and egress of cooling fluid.

5. In condensers, a plurality of superposed, hollow elements, passages extending through said elements, spaced lugs on said elements, adjacent elements being positioned so that said passages are on alternate sides of the condenser, said elements having openings on opposite sides, fittings positioned over adjacent openings to form a zigzag passage through the condenser for cooling fluid and clamping rods positioned between said lugs to hold the elements together.

In witness whereof, I have hereunto signed my name this 26 day of February, 1920.

MAX DONAUER.